3,000,878
PRODUCTION OF ALKYL-SUBSTITUTED EPSILON-CAPROLACTAMS

Benjamin Phillips, Charleston, Samuel W. Tinsley, South Charleston, and Paul S. Starcher, Charleston, W. Va., assignors to Union Carbide Corporation, a corporation of New York
No Drawing. Filed June 8, 1959, Ser. No. 818,538
5 Claims. (Cl. 260—239.3)

This invention is directed to a process for the production of alkyl-substituted epsilon-caprolactams. More particularly, this invention is directed to the reaction of alkyl-substituted epsilon-caprolactones with aqueous ammonia to produce alkyl-substituted epsilon-caprolactams and has for an object the provision of a process for manufacturing alkyl-substituted epsilon-caprolactams of a predetermined type. A particular object of this invention is to provide a one-step process for the production of alkyl-substituted epsilon-caprolactams to the substantial exclusion of various isomers which are produced by other processes known in the art.

A further object of this invention is to provide a continuous process for the production of alkyl-substituted epsilon-caprolactams. These and other objects will become readily apparent to those skilled in the art in light of the teachings herein set forth.

Heretofore, according to customary practices, the methods of producing alkyl-substituted epsilon-caprolactams involve the Beckmann rearrangement of alkyl-substituted cyclohexanone oximes producing a mixture of isomers. Thus, in the known procedure, random distribution of isomers occurs and it is impossible, from a practical standpoint, to isolate the individual isomers.

By virtue of the process of the invention, random distribution of isomers is substantially avoided and alkyl-substituted epsilon-caprolactams of a desired type can now be produced with greater selectivity and ease.

Quite unexpectedly a one-step process has been discovered producing a predetermined type of alkyl-substituted epsilon-caprolactam by reacting an alkyl-substituted epsilon-caprolactone with aqueous ammonia under superatmospheric pressures and high temperatures. The maximum yield of monomeric alkyl-substituted epsilon-caprolactam approximates 50 percent per pass since the process involves a complex mixture of equilibria. However, recycling the reaction products after removal of the formed monomeric alkyl-substituted epsilon-caprolactam, under conditions identical to those of the initial reaction, produces yield efficiencies of the epsilon-caprolactams as high as 85 to 95 percent to the substantial exclusion of polymeric products. Thus the process of this invention can be carried out continuously, the residence time in the reaction zone being such that, in view of the high temperature and superatmospheric pressures, maximum conversion will be obtained.

The process of this invention is directed to the preparation of alkyl-substituted epsilon-caprolactams from alkyl-substituted epsilon-caprolactones corresponding to the general formula:

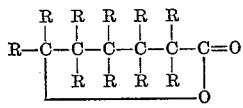

wherein R represents hydrogen atoms and at least one lower alkyl group containing from 1 through 8 carbon atoms; which comprises reacting an alkyl-substituted epsilon-caprolactone with aqueous ammonia and recovering the corresponding alkyl-substituted epsilon-caprolactam. A preferred group of epsilon-lactones suitable for employment in the process of this invention include alkyl-substituted-epsilon-caprolactones wherein the total number of carbon atoms in the alkyl groups does not exceed 12. Among the alkyl-substituted epsilon-caprolactones which are suitable for employment in the process of this invention are:

Gamma-isopropyl-epsilon-caprolactone
Alpha-methyl-epsilon-caprolactone
Beta-methyl-epsilon-caprolactone
Gamma-methyl-epsilon-caprolactone
Delta-methyl-epsilon-caprolactone
Epsilon-methyl-epsilon-caprolactone
Alpha-ethyl-epsilon-caprolactone
Beta-ethyl-epsilon-caprolactone
Gamma-ethyl-epsilon-caprolactone
Delta-ethyl-epsilon-caprolactone
Epsilon-ethyl-epsilon-caprolactone
Alpha,beta-dimethyl-epsilon-caprolactone
Alpha,gamma-dimethyl-epsilon-caprolactone
Alpha,delta-dimethyl-epsilon-caprolactone
Alpha,epsilon-dimethyl-epsilon-caprolactone
Beta,gamma-dimethyl-epsilon-caprolactone
Beta,delta-dimethyl-epsilon-caprolactone
Beta,epsilon-dimethyl-epsilon-caprolactone
Gamma,delta-dimethyl-epsilon-caprolactone
Gamma,epsilon-dimethyl-epsilon-caprolactone
Delta,epsilon-dimethyl-epsilon-caprolactone
Beta,beta,delta-trimethyl-epsilon-caprolactone
Alpha,beta,gamma-trimethyl-epsilon-caprolactone
Alpha,beta,epsilon-trimethyl-epsilon-caprolactone
Beta,gamma,delta-trimethyl-epsilon-caprolactone
Beta,gamma,epsilon-trimethyl-epsilon-caprolactone
Gamma,delta,epsilon-trimethyl-epsilon-caprolactone
Alpha-ethyl-beta-methyl-epsilon-caprolactone
Alpha-ethyl-gamma-methyl-epsilon-caprolactone
Alpha-ethyl-delta-methyl-epsilon-caprolactone
Alpha-ethyl-epsilon-methyl-epsilon-caprolactone
Beta-ethyl-alpha-methyl-epsilon-caprolactone
Beta-ethyl-gamma-methyl-epsilon-caprolactone
Beta-ethyl-delta-methyl-epsilon-caprolactone
Beta-ethyl-epsilon-methyl-epsilon-caprolactone
Gamma-ethyl-alpha-methyl-epsilon-caprolactone
Gamma-ethyl-beta-methyl-epsilon-caprolactone
Gamma-ethyl-delta-methyl-epsilon-caprolactone
Gamma-ethyl-epsilon-methyl-epsilon-caprolactone
Delta-ethyl-alpha-methyl-epsilon-caprolactone
Delta-ethyl-beta-methyl-epsilon-caprolactone
Delta-ethyl-gamma-methyl-epsilon-caprolactone
Delta-ethyl-epsilon-methyl-epsilon-caprolactone
Epsilon-ethyl-alpha-methyl-epsilon-caprolactone
Epsilon-ethyl-beta-methyl-epsilon-caprolactone
Epsilon-ethyl-gamma-methyl-epsilon-caprolactone
Epsilon-ethyl-delta-methyl-epsilon-caprolactone
Alpha,alpha-dimethyl-epsilon-caprolactone
Beta,beta-dimethyl-epsilon-caprolactone
Gamma,gamma-dimethyl-epsilon-caprolactone
Alpha,alpha,delta-trimethyl-epsilon-caprolactone
Beta,beta,gamma-trimethyl-epsilon-caprolactone
Gamma,gamma,epsilon-trimethyl-epsilon-caprolactone
Beta,beta-dimethyl-gamma-ethyl-epsilon-caprolactone The term "superatmospheric pressures" as used herein, is defined as the pressure produced by the reactants on heating in a closed vessel or pressures as high as 680 atmospheres, if desired. This pressure is maintained for the duration of the reaction.

Concentrations of ammonium hydroxide for purposes of this invention can range from 2 to 80 percent although these concentrations are not critical. The water diluent aids the reaction to form the monomeric epsilon-caprolactam. Molar ratios of ammonia to lactone can vary from about 1:1 to about 20:1 and more preferably from about 3:1 to about 10:1. While ratios above and below these amounts can also be employed, they are a less preferred embodiment of this novel process. Reaction temperatures for the production of alkyl-substituted epsilon-caprolactams can extend over a range of from about 300° C. to about 475° C. and preferably from about 350° C. to about 425° C. At temperatures below 300° C., the quantities of alkyl-substituted epsilon-caprolactams formed are not sufficient for economical operation.

The time of reaction is not necessarily critical and may vary from 10 minutes to as much as a day depending on the reaction conditions. Most desirably, conditions are adjusted so as to complete the reaction in about one to three hours.

The alkyl-substituted epsilon-caprolactams can be isolated from the reaction mixture by extraction with chloroform or some other water-insoluble solvent and further purified by fractional distillation. The unused epsilon-caprolactones and equilibrium products may then be recycled for further reaction.

The following examples illustrate and describe the process involving the production of alkyl-substituted epsilon-caprolactams in accordance with the invention.

EXAMPLE I

*Preparation of epsilon-methyl-epsilon-caprolactam*

A mixture of 910 grams (15 mols) of 28 percent aqueous ammonia and 320 grams (2.5 mols) of epsilon-methyl-epsilon-caprolactone is heated in a stainless steel bomb for three hours at 375° C. and 272 atmospheres pressure. The reaction mixture obtained is extracted four times with chloroform. Distillation of the chloroform layers produces 142 grams (45.4 percent yield) of epsilon-methyl-epsilon-caprolactam having the following properties:

Boiling point 116–120° C. at 1.5 millimeters mercury.
Melting point 88–91° C.
Percent nitrogen calculated 11.0; found 11.46.

The infrared spectrum is consistent with the assigned structure.

EXAMPLE II

*Preparation of beta,epsilon-dimethyl-epsilon-caprolactam*

A mixture of 910 grams (15 mols) of 28 percent aqueous ammonia and 335 grams (2.5 mols) of beta,epsilon-dimethyl-epsilon-caprolactone is heated in a stainless steel bomb for three hours at 360° C. and 272 atmospheres pressure. The reaction mixture obtained is extracted four times with chloroform. Distillation of the chloroform layers produces 168 grams (47.7 percent yield) of beta,epsilon-dimethyl-epsilon-caprolactam having the following properties:

Boiling point 119–122 at 2–3 millimeters mercury.
Percent nitrogen calculated 9.9; found 10.02.

The infrared spectrum is consistent with the assigned structure.

EXAMPLE III

*Preparation of epsilon-methyl-epsilon-caprolactam*

A mixture of 910 grams (15 mols) of 28 percent aqueous ammonia and 320 grams (2.5 mols) of epsilon-methyl-epsilon-caprolactone is heated in a stainless steel bomb for three hours at 325° C. and 272 atmospheres pressure. The reaction mixture obtained is extracted four times with chloroform. Distillation of the chloroform layers produces 96.5 grams (30.3 percent yield) of epsilon-methyl-epsilon-caprolactam. The infrared spectrum is consistent with the assigned structure.

EXAMPLE IV

*Preparation of epsilon-sec-epsilon-caprolactam*

A mixture of 455 grams (7.5 mols) of 14 percent aqueous ammonia and 363 grams (2.5 mols) of epsilon-sec-butyl-epsilon-caprolactone is heated in a stainless steel bomb for 3 hours at 400° C. and 340 atmospheres pressure. The reaction mixture obtained is extracted four times with chloroform. Distillation of the chloroform layers produces 176 grams (49.3 percent) of epsilon-sec-butyl-epsilon-caprolactam. The infrared spectrum is consistent with the assigned structure.

EXAMPLE V

*Preparation of mixed dimethyl-epsilon caprolactams*

A mixture of 912 grams (15 mols) of 28 percent aqueous ammonia and 355 grams (2.5 mols) of mixed dimethyl-epsilon-caprolactones is heated for three hours at 350° C. under autogenous pressure. The reaction mixture upon cooling is extracted four times with 300 milliliter portions of chloroform. Distillation of the chloroform extracts produces 168 grams (47.7 percent yield) of mixed dimethyl-epsilon-caprolactams having the following properties:

Boiling point 117°–129° C. at 2–3 millimeters mercury
Refractive index N 30/D 1.4751–1.4817
Percent nitrogen calculated 9.9; found 9.64

The infrared spectrum is consistent with the assigned structure.

EXAMPLE VI

*Preparation of mixed methyl-epsilon-caprolactams*

A mixture of 910 grams (15 mols) of 28 percent aqueous ammonia and 320 grams (2.5 mols) of mixed beta-, gamma-, delta-, and epsilon-methyl-epsilon-capra-lactones is heated in a stainless steel bomb for three hours at 350° C. and 272 atmospheres pressure. The reaction mixture obtained from two duplicate runs is extracted four times with chloroform. Distillation of the chloroform layers gives 288 grams (45.4 percent yield) of a mixture of beta-, gamma-, delta-, and epsilon-methyl-epsilon-caprolactams, having the following properties:

Boiling point 114°–124° C. at 1.5 millimeters mercury
Refractive index N 30/D 1.4787–1.4829
Percent nitrogen calculated 11.0; found 11.62

The infrared spectrum was consistent with the assigned structure.

What is claimed is:

1. A process for the production of alkyl-substituted epsilon-caprolactams, which comprises reacting an alkyl-substituted epsilon-caprolactone, of the formula

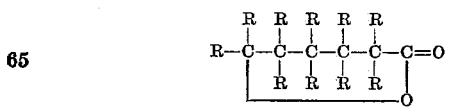

wherein R represents hydrogen atoms and at least one lower alkyl group, with aqueous ammonia in a temperature range of about 300° C. to about 475° C. and under superatmospheric pressures.

2. The process of claim 1 wherein the temperatures range from about 350° C. to about 425° C.

3. The process of claim 1 wherein the alkyl-substituted epsilon-caprolactone used is epsilon-methyl-epsilon-caprolactone producing epsilon-methyl-epsilon-caprolactam.

4. The process of claim 1 wherein the alkyl-substituted epsilon-caprolactone used is beta,epsilon-dimethyl-epsilon-caprolactone producing beta,epsilon-dimethyl-epsilon-caprolactam.

5. The process of claim 1 wherein the alkyl-substituted epsilon-caprolactone used is epsilon-sec-butyl-epsilon-caprolactone producing epsilon-sec-butyl-epsilon-caprolactam.

References Cited in the file of this patent
UNITED STATES PATENTS

| | | |
|---|---|---|
| 2,758,991 | Kretzers et al. | Aug. 14, 1956 |
| 2,930,790 | Weise | Mar. 29, 1960 |
| 2,952,675 | Bolle | Sept. 13, 1960 |

OTHER REFERENCES

Spath et al.: Berichte, vol. 69 (1936), pages 2727–31.